(12) United States Patent
Campbell et al.

(10) Patent No.: US 9,213,410 B2
(45) Date of Patent: Dec. 15, 2015

(54) ASSOCIATED FILE

(75) Inventors: Robert Campbell, Cupertino, CA (US);
Bradley Suggs, Sunnyvale, CA (US);
John P. McCarthy, Pleasanton, CA (US)

(73) Assignee: Hewlett-Packard Development Company L.P., Houston, TX (US)

( * ) Notice: Subject to any disclaimer, the term of this patent is extended or adjusted under 35 U.S.C. 154(b) by 243 days.

(21) Appl. No.: 13/387,103

(22) PCT Filed: Mar. 26, 2010

(86) PCT No.: PCT/US2010/028804
§ 371 (c)(1),
(2), (4) Date: Jan. 25, 2012

(87) PCT Pub. No.: WO2011/119167
PCT Pub. Date: Sep. 29, 2011

(65) Prior Publication Data
US 2012/0137259 A1    May 31, 2012

(51) Int. Cl.
*G06F 3/033* (2013.01)
*G06F 3/01* (2006.01)
*G06F 3/03* (2006.01)

(52) U.S. Cl.
CPC .............. *G06F 3/017* (2013.01); *G06F 3/0304* (2013.01)

(58) Field of Classification Search
CPC ... G06F 3/0481; G06F 3/017; G06F 3/04895; G06F 3/4446; G06F 3/04812
USPC .................... 715/863, 711; 707/703; 358/403
See application file for complete search history.

(56) References Cited

U.S. PATENT DOCUMENTS

| | | | |
|---|---|---|---|
| 5,732,227 A | 3/1998 | Kuzunuki et al. | |
| 5,917,490 A * | 6/1999 | Kuzunuki et al. | ............. 715/775 |
| 5,947,478 A * | 9/1999 | Kwan | ................... A63F 9/0096 273/460 |
| 5,953,735 A * | 9/1999 | Forcier | ................ G06F 715/273 715/273 |
| 6,115,739 A * | 9/2000 | Ogawa et al. | ................. 709/215 |
| 6,185,683 B1 * | 2/2001 | Ginter et al. | ................... 713/176 |
| 6,266,057 B1 * | 7/2001 | Kuzunuki et al. | ............. 715/745 |
| 6,330,486 B1 * | 12/2001 | Padula | .................... G06F 3/011 381/306 |
| 6,330,975 B1 * | 12/2001 | Bunte | ................ H04N 1/00127 235/470 |
| 6,377,296 B1 | 4/2002 | Zlatsin | |
| 6,430,563 B1 * | 8/2002 | Fritz et al. | ..................... 707/694 |
| 6,499,665 B1 * | 12/2002 | Meunier et al. | ............... 235/487 |
| 6,898,307 B1 | 5/2005 | Harrington | |
| 7,003,731 B1 * | 2/2006 | Rhoads et al. | ................. 715/768 |
| 7,042,440 B2 | 5/2006 | Pryor et al. | |
| 7,164,413 B2 * | 1/2007 | Davis et al. | .................... 345/163 |

(Continued)

FOREIGN PATENT DOCUMENTS

GB    2451461    2/2009

OTHER PUBLICATIONS

WIPO, International Search Report dated Apr. 27, 2012, PCT/US2010/028804 filed Mar. 26, 2010.

(Continued)

*Primary Examiner* — Jessica Chuang
(74) *Attorney, Agent, or Firm* — Hewlett-Packard Patent Department (57) ABSTRACT

A method for accessing a file on a computing machine including configuring a sensor to detect an object and a user interacting with the object, associating the object with at least one file on the computing machine, and configuring a display device to render an associated file being accessed in response to the user interacting with the object.

19 Claims, 8 Drawing Sheets

(56) References Cited

U.S. PATENT DOCUMENTS

| | | | |
|---|---|---|---|
| 7,283,983 B2 * | 10/2007 | Dooley | G06K 9/0035 706/20 |
| 7,358,962 B2 * | 4/2008 | Dehlin et al. | 345/173 |
| 7,421,155 B2 * | 9/2008 | King et al. | 382/312 |
| 7,469,097 B2 * | 12/2008 | Yost | H04N 1/00183 348/240.3 |
| 7,479,950 B2 * | 1/2009 | Dehlin et al. | 345/173 |
| 7,519,223 B2 | 4/2009 | Dehlin et al. | |
| 7,578,441 B2 * | 8/2009 | Gower et al. | 235/454 |
| 7,593,605 B2 * | 9/2009 | King et al. | 382/313 |
| 7,593,950 B2 * | 9/2009 | Silverman et al. | |
| 7,596,766 B1 * | 9/2009 | Sharma | G06F 3/04895 715/711 |
| 7,606,741 B2 * | 10/2009 | King et al. | 705/27.2 |
| 7,773,822 B2 * | 8/2010 | Walker | 382/254 |
| 7,900,000 B2 * | 3/2011 | Nakamura et al. | 711/156 |
| 7,957,018 B2 * | 6/2011 | Rudolph et al. | 358/1.15 |
| 7,986,806 B2 * | 7/2011 | Rhoads | 382/100 |
| 8,001,613 B2 * | 8/2011 | Duncan | 726/28 |
| 8,005,720 B2 * | 8/2011 | King et al. | 705/26.1 |
| 8,156,115 B1 * | 4/2012 | Erol et al. | 707/728 |
| 8,199,117 B2 * | 6/2012 | Izadi et al. | 345/173 |
| 8,228,542 B2 * | 7/2012 | Coley et al. | 358/1.15 |
| 8,230,337 B2 * | 7/2012 | Rhoads et al. | 715/704 |
| 8,269,175 B2 * | 9/2012 | Alameh et al. | 250/349 |
| 8,285,047 B2 * | 10/2012 | Nagarajan et al. | 382/175 |
| 8,289,288 B2 * | 10/2012 | Whytock et al. | 345/173 |
| 8,467,991 B2 * | 6/2013 | Khosravy et al. | 702/153 |
| 8,487,938 B2 * | 7/2013 | Latta et al. | 345/473 |
| 8,509,475 B2 * | 8/2013 | Denzler et al. | 382/100 |
| 8,531,396 B2 * | 9/2013 | Underkoffler et al. | 345/158 |
| 8,533,192 B2 * | 9/2013 | Moganti et al. | 707/737 |
| 8,542,252 B2 * | 9/2013 | Perez et al. | 345/649 |
| 8,745,541 B2 * | 6/2014 | Wilson et al. | 715/863 |
| 8,902,445 B2 * | 12/2014 | Yoshida | H04N 1/00347 358/1.13 |
| 2002/0126161 A1 * | 9/2002 | Kuzunuki | G06F 3/033 715/863 |
| 2002/0131076 A1 * | 9/2002 | Davis | 358/1.15 |
| 2002/0164054 A1 * | 11/2002 | McCartney | A61B 5/1176 382/118 |
| 2003/0040957 A1 * | 2/2003 | Rodriguez | G06T 1/0021 705/14.26 |
| 2004/0125414 A1 * | 7/2004 | Ohishi et al. | 358/402 |
| 2004/0193413 A1 * | 9/2004 | Wilson et al. | 704/243 |
| 2004/0215689 A1 * | 10/2004 | Dooley | G06K 9/00335 709/200 |
| 2005/0013462 A1 * | 1/2005 | Rhoads | 382/100 |
| 2005/0040224 A1 * | 2/2005 | Brinton | G08G 1/20 235/376 |
| 2005/0078088 A1 * | 4/2005 | Davis et al. | 345/163 |
| 2005/0128196 A1 * | 6/2005 | Popescu | G01B 11/25 345/420 |
| 2005/0275635 A1 * | 12/2005 | Dehlin et al. | 345/173 |
| 2005/0275636 A1 * | 12/2005 | Dehlin et al. | 345/173 |
| 2006/0001645 A1 * | 1/2006 | Drucker et al. | 345/156 |
| 2006/0001650 A1 * | 1/2006 | Robbins et al. | 345/173 |
| 2006/0007123 A1 | 1/2006 | Wilson | |
| 2006/0007124 A1 * | 1/2006 | Dehlin | 345/156 |
| 2006/0092170 A1 | 5/2006 | Bathiche et al. | |
| 2006/0230038 A1 * | 10/2006 | Silverman et al. | 707/6 |
| 2006/0238347 A1 * | 10/2006 | Parkinson | G08B 13/1436 340/572.4 |
| 2006/0279798 A1 * | 12/2006 | Rudolph et al. | 358/403 |
| 2007/0011149 A1 * | 1/2007 | Walker | 707/4 |
| 2007/0060336 A1 | 3/2007 | Marks et al. | |
| 2007/0094296 A1 * | 4/2007 | Peters, III | 707/102 |
| 2007/0138256 A1 * | 6/2007 | Coventry | G07F 19/20 235/379 |
| 2007/0140678 A1 * | 6/2007 | Yost | H04N 1/00183 396/147 |
| 2007/0208805 A1 * | 9/2007 | Rhoads et al. | 709/203 |
| 2007/0211022 A1 | 9/2007 | Boillot | |
| 2008/0074707 A1 * | 3/2008 | Cranitch et al. | 358/403 |
| 2008/0080789 A1 | 4/2008 | Marks et al. | |
| 2008/0189081 A1 * | 8/2008 | Chang et al. | 703/1 |
| 2008/0231609 A1 * | 9/2008 | Dehlin et al. | 345/173 |
| 2008/0258863 A1 * | 10/2008 | Vrielink | G01S 5/02 340/5.2 |
| 2008/0281851 A1 * | 11/2008 | Izadi et al. | 707/102 |
| 2009/0139778 A1 | 6/2009 | Butler et al. | |
| 2009/0215471 A1 * | 8/2009 | Sands | G01S 13/876 455/457 |
| 2009/0237245 A1 * | 9/2009 | Brinton | G07C 5/008 340/540 |
| 2009/0251285 A1 * | 10/2009 | Do et al. | 340/5.74 |
| 2009/0251748 A1 * | 10/2009 | Luttmer | 358/518 |
| 2009/0282130 A1 * | 11/2009 | Antoniou | H04L 41/0886 709/220 |
| 2009/0286572 A1 * | 11/2009 | Rhoads et al. | 455/557 |
| 2009/0319181 A1 * | 12/2009 | Khosravy et al. | 701/208 |
| 2009/0323128 A1 * | 12/2009 | Asuri et al. | 358/403 |
| 2010/0008255 A1 * | 1/2010 | Khosravy et al. | 370/254 |
| 2010/0045816 A1 * | 2/2010 | Rhoads | 348/222.1 |
| 2010/0091338 A1 * | 4/2010 | Ohishi et al. | 358/402 |
| 2010/0171993 A1 * | 7/2010 | Longobardi et al. | 358/403 |
| 2010/0174618 A1 * | 7/2010 | Driessen | 705/26 |
| 2010/0188713 A1 * | 7/2010 | Ogura et al. | 358/474 |
| 2010/0299390 A1 * | 11/2010 | Alameh et al. | 709/204 |
| 2010/0302247 A1 * | 12/2010 | Perez et al. | 345/440 |
| 2010/0306283 A1 * | 12/2010 | Johnson et al. | 707/803 |
| 2011/0025876 A1 * | 2/2011 | Denzler et al. | 348/222.1 |
| 2011/0026068 A1 * | 2/2011 | Yoshida | H04N 1/00347 358/1.14 |
| 2011/0101085 A1 * | 5/2011 | Nakagawa | 235/375 |
| 2011/0181421 A1 * | 7/2011 | Nabata | A24F 47/00 340/573.1 |
| 2012/0061460 A1 * | 3/2012 | Mackley et al. | 235/375 |
| 2012/0072420 A1 * | 3/2012 | Moganti et al. | 707/737 |
| 2012/0132701 A1 * | 5/2012 | Nakagawa et al. | 235/375 |
| 2013/0126596 A1 * | 5/2013 | Fletcher et al. | 235/375 |
| 2014/0143725 A1 * | 5/2014 | Lee | 715/834 |
| 2015/0032634 A1 * | 1/2015 | D'Agostino | G06Q 20/3829 705/71 |
| 2015/0049115 A1 * | 2/2015 | Oikawa | G02B 27/017 345/633 |
| 2015/0161558 A1 * | 6/2015 | Gitchell | G06Q 10/087 235/375 |

OTHER PUBLICATIONS

Extended European Search Report, EP Application No. 10848601.0, Date of Completion: Aug. 29, 2014, Date of Mailing: Sep. 8, 2014, pp. 1-7.

Pierre Wellner, "The Digital Desk Calculator: Tangible Manipulation on a Desk Top Display," UIST'91, Nov. 11-13, 1991, pp. 27-33.

* cited by examiner

ASSOCIATED FILE

BACKGROUND

When accessing files on a computing machine, a user can utilize one or more input devices coupled to the computing machine. The user can configure or manipulate one or more of the input devices when selecting at least one file on the computing machine to access. Once at least one of the files has been selected by the user, the user can proceed to access and/or manipulate at least one the files utilizing the input device and the computing machine.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
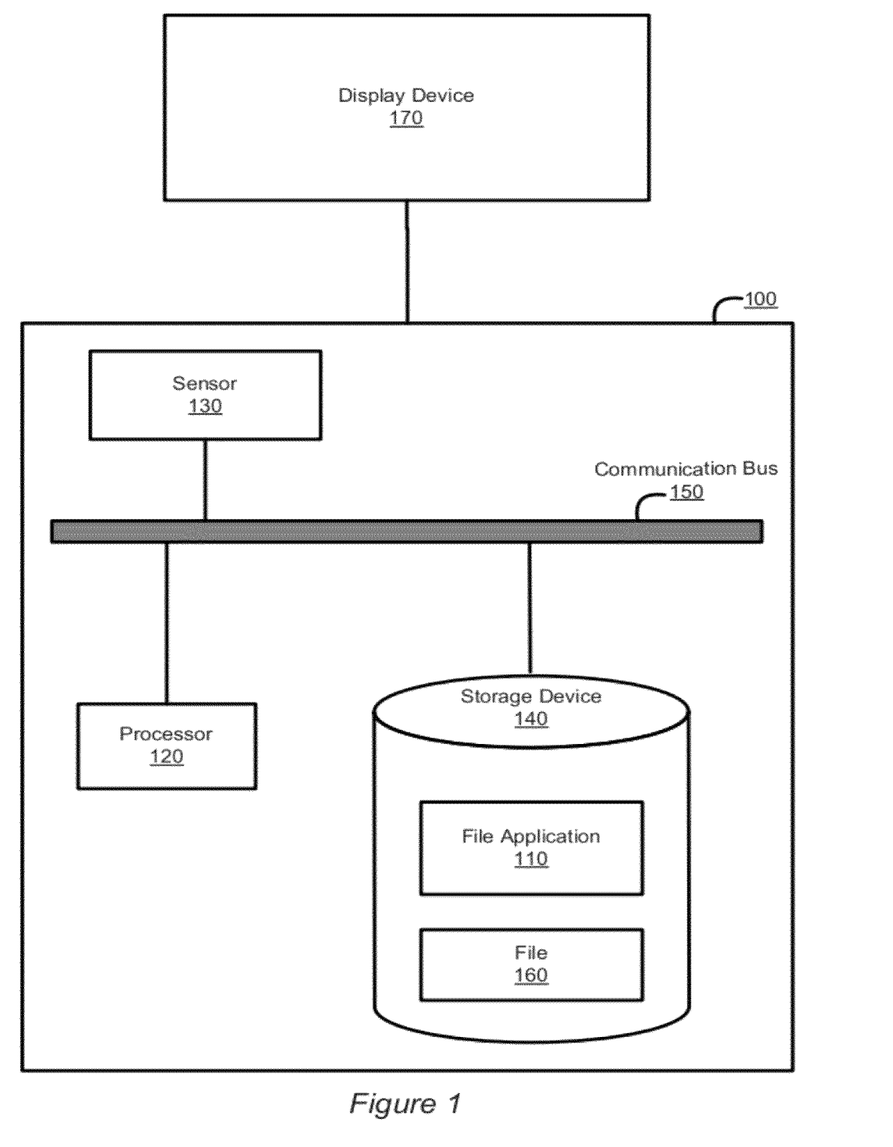
FIG. 1 illustrates a computing machine with a processor, a sensor, a storage device, and a file application according to an embodiment of the invention.

FIG. 1 illustrates a computing machine with a processor, a sensor, a storage device, and a file application according to an embodiment of the invention. In one embodiment, the computing machine 100 is a desktop, laptop/notebook, netbook, and/or any other computing device the sensor 130 can be coupled to. As illustrated in FIG. 1, the computing machine 100 is coupled to a processor 120, a sensor 130, a storage device 140, a display device 170, and a communication bus 150 for the computing machine 100 and/or one or more components of the computing machine 100 to communicate with one another.

Further, as shown in FIG. 1, the storage device 140 can store a file application 110. In other embodiments, the computing machine 100 includes additional components and/or is coupled to additional components in addition to and/or in lieu of those noted above and as illustrated in FIG. 1.

As noted above, the computing machine 100 includes a processor 120. The processor 120 sends data and/or instructions to one or more components of the computing machine 100, such as the sensor 130 and/or the file application 110. Additionally, the processor 120 receives data and/or instruction from one or more components of the computing machine 100, such as the sensor 130 and/or the file application 110.

The file application 110 is an application which can be utilized in conjunction with the processor 120 and at least one sensor 130 to detect an object and a user interacting with the object. When detecting the user interacting with the object, a sensor 130 can additionally be configured to capture the user interacting with the object. For the purposes of this application, an object can be any physical object, media, and/or document which a sensor 130 can detect and a user can physically interact with.

In one embodiment, the object includes a document, a folder of documents, a book, a notepad, and/or a newspaper. In other embodiments, the object can include additional objects or additional forms of physical media or documents in addition to and/or in lieu of those noted above.

A user can be any person which can physically interact with an object. If the object is detected by the sensor 130, the file application 110 can proceed to associate the object with at least one file 160 on the computing machine 100. A file 160 on the computing machine can be a digital file. The digital file can be a digital document, a system or application file, a digital media file and/or any additional digital file type. The file 160 can include numbers, characters, and/or a combination of the above. Additionally, the file 160 can include audio, video, images, and/or a combination of the above.

Once the file application 110 has associated the object with at least one file 160, the file application 110 can configure a display device 170 to render a user accessing an associated file 160. Further, the file application 110 can edit one or more associated files 160 on the computing machine 100 in response to the user interacting with the object.

The file application 110 can be firmware which is embedded onto the computing machine 100. In other embodiments, the file application 110 is a software application stored on the computing machine 100 within ROM or on the storage device 140 accessible by the computing machine 100 or the file application 110 is stored on a computer readable medium readable and accessible by the computing machine 100 from a different location.

Additionally, in one embodiment, the storage device 140 is included in the computing machine 100. In other embodiments, the storage device 140 is not included in the computing machine 100, but is accessible to the computing machine 100 utilizing a network interface of the computing machine 100. The network interface can be a wired or wireless network interface card.

In a further embodiment, the file application 110 is stored and/or accessed through a server coupled through a local area network or a wide area network. The file application 110 communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the file application 110 can be utilized in conjunction with the processor 120 and at least one sensor 130 to detect an object and/or capture a user interacting with the object. When detecting the object and the user interacting with the object, the file application 110 and/or the processor 120 can configure the sensor 130 to scan an environment around the computing machine 100 for an object and/or the user. For the purposes of this application, the environment includes a space or volume around the computing machine 100 and/or around the sensor 130.

A sensor 130 is a detection device configured to scan for or to receive information from the environment around the sensor 130 or the computing machine 100. In one embodiment, a sensor 130 is a 3D depth image capturing device configured to scan a volume in front of the sensor 130. In another embodiment, the sensor 130 can include at least one from the group consisting of a motion sensor, a proximity sensor, an infrared sensor, a stereo device, and/or any additional image capturing device. In other embodiments, a sensor 130 can include additional devices and/or components configured to receive and/or to scan for information from an environment around the sensor 130 or the computing machine 100.

A sensor 130 can be configured by the processor 120 and/or the file application 110 to actively, periodically, or upon request scan the environment for the object and/or the user. When configuring the sensor 130, the processor 120 and/or the file application 110 can send one or more instructions for the sensor 130 to scan the environment. Further, at least one sensor 130 can be coupled to one or more locations on or around the computing machine 100. In another embodiment, at least one sensor 130 can be integrated as part of the computing machine 100. In other embodiments, at least one of the sensors 130 can be coupled to or integrated as part of one or more components of the computing machine 100, such as the display device 170.

In one embodiment, if an object and a user are found by the sensor 130 within the volume or viewing area of the sensor 130, the sensor 130 can proceed to capture and identify a distance of the object. The file application 110 will then compare the identified distance of the object to a predefined distance.

The predefined distance can be defined by the file application 110, the computing machine 100, and/or by a user.

In one embodiment, if the object is within a predefined distance of the computing machine 100 and/or the sensor 130, the file application 110 will configure the sensor 130 to detect and/or capture information of the object and proceed to identify the object. In another embodiment, if the identified distance is greater than the predefined distance, the file application 110 can configure the display device 160 to prompt the user to bring the object closer to the computing machine 100 and/or the sensor 130.

When detecting and/or capturing information of the object, the file application 110 configures the sensor 130 to scans the object for information which can identify the object. In one embodiment, the file application 110 configures the sensor 130 to capture and identify at least one dimension of the object. A dimension of the object can include a length of the object, a width of the object, a shape of the object, and/or a color of the object. In another embodiment, the object can include a bar code or a visual signature and the file application 110 can configure the sensor 130 to scan the bar code or the visual signature. In other embodiments, the sensor 130 can capture an image of the object.

Utilizing the detected and/or captured information of the object, the file application 110 can attempt to identify the object by comparing the information to predefined information corresponding to one or more recognized objects of the computing machine 100. A recognized object is an object which is recognized by the computing machine 100 and is associated with one or more files 160 on the computing machine 100.

The predefined information of the recognized object can list dimensions of the corresponding recognized object. In another embodiment, the predefined information lists a bar code or visual signature of an object which is recognized by the computing machine 100 and is associated with corresponding media 160. In other embodiments, the predefined information includes an image of a recognized object of the computing machine 100.

The predefined information can be included as part of one or more files 160 on the computing machine 100. In another embodiment, the predefined information can be stored in a list of objects. In other embodiments, the predefined information can be included in a database of objects. The list of object and/or the database of objects can be stored in the storage device 140 or on another device accessible to the file application 110, Further, a recognized object can list one or more files 160 on the computing machine 100 associated with the corresponding recognized object. If a match is found between the captured information and the predefined information, the file application 110 will proceed to identify the object as the recognized object. Additionally, the file application 110 will associate the object with one or more of the files 160 listed to be associated with the recognized object.

As a result, the file application 110 associates at least one of the files 160 with the object. In another embodiment, if no match is found, the file application 110 can associate the object with one or more files 160 on the computing machine 100 in response to the user interacting with the object. When associating one or more of the files in response to the user interacting with the object, the file application can configure the display device 170 to render one or more of the files 170 for display.

A display device 170 is a device that can create and/or project one or more images and/or videos for display. In one embodiment, the display device 170 can be a monitor and/or a television. In another embodiment, the display device 170 is a projector that can project one or more images and/or videos. The display device 170 can include analog and/or digital technology. Additionally, the display device 170 can be coupled to the computing machine 100 or the display device 170 can be integrated as part of the computing machine 100.

When utilizing a user interaction to associate the object with one or more files 160 on the computing machine 100, the sensor 130 can detect the user interacting with the object through one or more gestures. A gesture can correspond to a command recognized by file application 110 and/or the computing machine 100. Further, the gesture can be made by the user to or from the object. Additionally, the gesture can be made by the user between the object and the computing machine 100.

In one embodiment, the gesture can be a visual motion made by the user to or from the object or the computing machine 100. The visual motion can include one or more hand motions or hand gestures. In another embodiment, the gesture can include audio from the user captured by the sensor 130 or touch motions made by the user and detected by the sensor 130.

In one embodiment, when associating the object with one or more files 160, the sensor 130 can detect the user making one or more hand gestures. The sensor can detect the user closing his hand over the object and moving his hand to one or more files 160 being displayed on the display device 170. The user can then release his hand to an open position over an area of the display device 170 where one or more of the files 160 are rendered. In response, the file application 110 can identify which of the files 160 are being rendered at the area of the display device 170 and proceed to associate the corresponding file or files 160 with the object, In another embodiment, the file application 110 can additionally create a binary and/or pixel map to identify a position of the object, the user, the computing machine, and/or one or more file rendered for display. As the user makes one or more gestures, the file application 110 can track and mark the coordinate and/or positions of where the gesture is being made. As a result, the file application can accurately track a direction of the gesture and identify which object or files are included in the gesture.

Once the user has associated the object with one or more of the files, the file application 110 can proceed to store the information of the corresponding object and store the detected and/or captured information as predefined information of a recognized object associated with the one or more of the files 160.

Additionally, in response to the object being associated with one or more of the files 160 on the computing machine 100, the file application 110 can proceed to access the associated files 160. Additionally, the file application 110 can render the associated files 160 for a user to continue to access or edit in response to the user interacting with the object through at least one gesture.

In one embodiment, when accessing or editing an associated file 160, the file application 110 configures the sensor 130 to capture a gesture from the user and proceeds to identify a corresponding command associated with the gesture. The file application 110 can then proceed to execute the identified command on one or more of the associated files 160.

In one embodiment, one or more of the associated files 160 list commands which can be executed on the associated files 160. Additionally, the commands can list a corresponding gesture which can be entered by the user when entering the command. In another embodiment, one or more commands and the corresponding gestures are stored in a list of commands or in a database of commands.

When accessing or editing one or more of the associated files 160, the file application 110 can scroll through one or more of the associated files. Additionally, the file application 110 can edit the associated files by adding or removing content from one or more of the associated files 160. In another embodiment, the file application 110 can associate the associated files 160 with additional files 160 on the computing machine 100. In other embodiments, the file application 110 can perform additional commands and/or execute additional commands on one or more associated files 160 in addition to and/or in lieu of those noted above.

Figure 2:
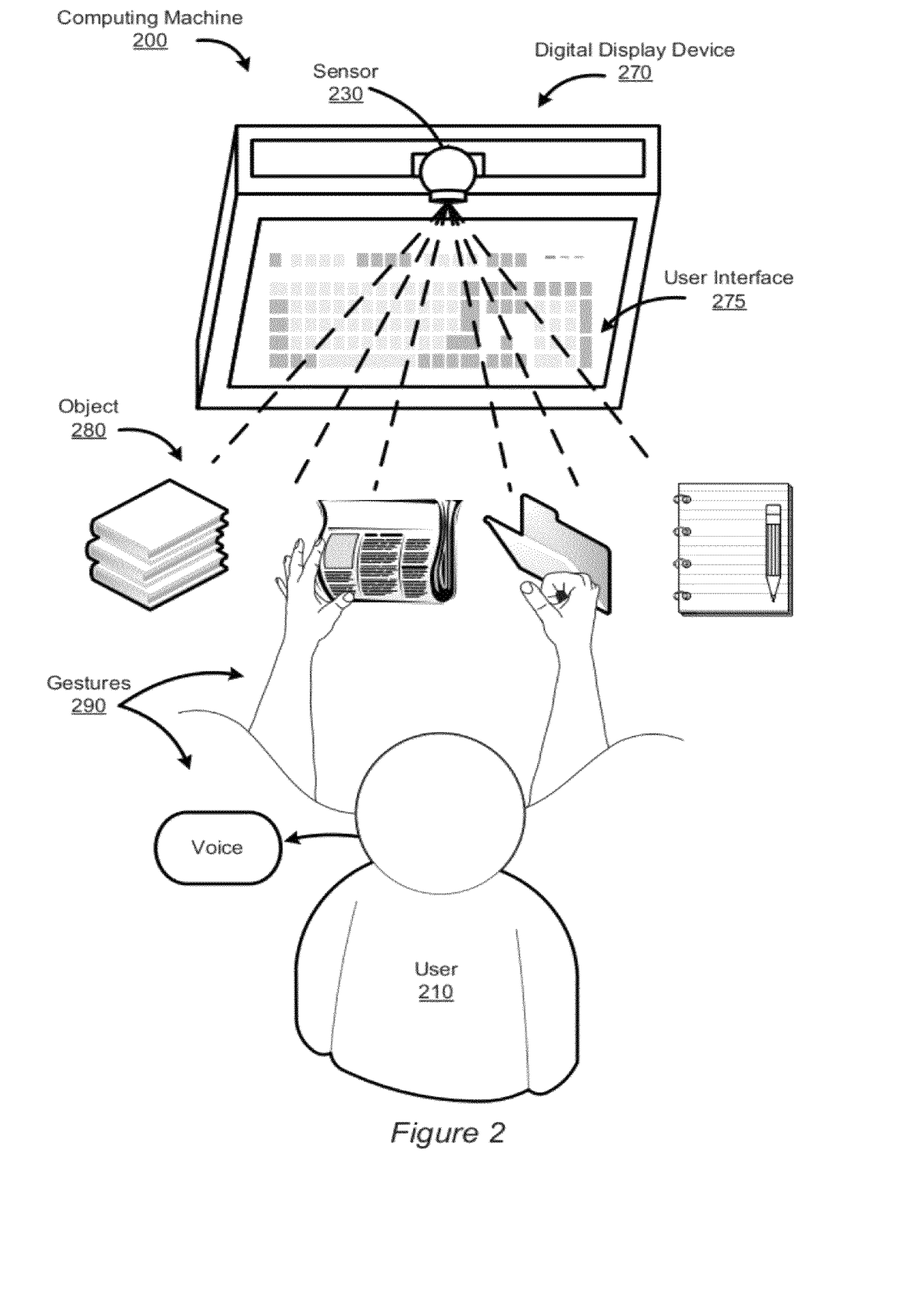
FIG. 2 illustrates a sensor coupled to a computing machine detecting an object and a user interacting with the object according to an embodiment of the invention.

FIG. 2 illustrates a sensor 230 coupled to a computing machine 200 detecting an object 280 and a user interacting with the object 280 according to an embodiment of the invention. In one embodiment, the sensor 230 can be a 3D depth image capture device and the sensor 230 can be coupled to a display device 270 of the computing machine 200. In other embodiments, the sensor 230 can be any additional detection devices and the sensor 230 can be coupled to additional locations or positions around the computing machine 200.

Additionally, as illustrated in FIG. 2, the sensor 230 can be configured to face towards one or more directions around the computing machine 200. In one embodiment, the sensor 230 is a front facing sensor. In another embodiment, sensor 230 can be configured to rotate around and/or reposition along one or more axis.

As noted above, the sensor 230 is configured by a processor of the computing machine 200 and/or a file application to detect and/or capture information of an object 280. Additionally, the sensor 230 is configured to detect and/or capture a user 210 interacting with the object 280. In response to detecting the object 280 and the user 210 interacting the object 280, the file application can associate the object 280 with one or more files on the computing machine 200. Additionally, the file application can access and/or edit one or more of the associated files in response to the user 210 interacting with the object 280.

As shown in the present embodiment, the sensor 230 can be configured to detect and/or capture a view or a volume of an environment around the computing machine 200 by scanning and/or detecting information around the computing machine 200. The sensor 230 captures a view of any objects 280 within the environment of the computing machine 200. As noted above, the sensor 230 can actively scan the environment for an object 280 or the sensor 230 can periodically or upon request scan the environment for an object 280.

As illustrated in FIG. 2, the object 280 can be any physical object, media, and/or document. The physical media or documents can include one or more books, a newspaper, a folder or collection of documents, and/or a notepad. In other embodiment, the object 280 can include other additional forms of physical media or documents which the user 210 can interact with in addition to and/or in lieu of those noted above and illustrated in FIG. 2.

Once an object 280 has been found within a view of the sensor 230, the sensor 230 can proceed to determine a distance of the object 280. As noted above, the sensor 230 can be a 3D depth image capturing device. The sensor 230 can scan a volume or a viewing area in front of the sensor 230 for the object 280 and/or the user. The sensor 230 can then identify the distance of any object 280 and/or user detected within the volume or the viewing area.

The sensor 230 then passes the identified distance of the object 280 to a file application. The file application compares the captured distance to a predefined distance to determine whether the object 280 is within proximity of the computing machine 200 and/or the sensor 230. If the file application determines that the distance of the object is greater than the predefined distance, the file application can render a user interface 275 on the display device 270 to prompt the user 210 to bring the object 280 closer so the file application can identify the object 280.

Additionally, the user interface 275 can be configured to render the object 280 and/or the user 210. In another embodiment, the user interface 275 can additionally be configured by the file application to render one or more files of the computing machine and/or the user 210 accessing one or more of the files. In other embodiments, the user interface 275 can be configured to display additional information or details in addition to and/or in lieu of those noted above.

If the file application determines that the distance of the object 280 is less than the predefined distance, then the object 280 will be determined to be within proximity of the computing machine 200 and/or the sensor 230. The file application will then proceed to identify the object 280 and associate the object 280 with one or more files on the computing machine 200.

As noted above, when identifying the object 280, the sensor 230 can detect and/or capture information of the object 280. The information can include one or more dimensions of the object 280. The dimensions can include a length, a width, a height, a shape, and/or a color of the object 280. In another embodiment, the information can include a bar code or a visual signature on the object 280. In other embodiments, the information can include an image of the object 280.

The file application can then compare the information to predefined information corresponding to one or more recognized objects on the computing machine 200. As noted above, a recognized object can be associated with one or more files on the computing machine 200. If a match is found, then the file application will proceed to identify the object as the recognized object and associate the object 280 with one or more of the files associated with the corresponding recognized object.

In another embodiment, if no match is found, the user 210 can associate the object 280 with one or more of the files on the computing machine 200 using one or more gestures 290. The file application can additionally configure the digital display device 210 to render the user interface 380 to prompt the user 210 to associate the object 280 with one or more of the files on the computing machine 200.

As noted above and as illustrated in FIG. 2, the sensor 230 can detect and capture one or more visual gestures 290, one or more audio gestures 290, and/or one or more touch gestures 290 when the user 210 is interacting with the object 280. The sensor 230 can detect a type, a length, and/or a motion of the gesture 290. Further, the sensor 230 can identify where the gesture 290 is being made.

As shown in FIG. 2, a visual gesture 290 can include one or more hand motions or hand gestures. Additionally, an audio gesture 290 can include the user speaking. In other embodiments, the user 210 can make additional gestures 290 while interacting with the object 280 and the sensor 230 can be configured to detect and capture one or more of the gestures 290 made by the user 210.

Utilizing one or more captured gesture 290, the user 210 can associate the object 280 with one or more files on the computing machine. Once the object 280 is associated with one or more of the files, the file application can configure the display device 270 to render one or more of the associated files. In one embodiment, the display device 270 further renders the user interface 275 to display one or more of the associated files being accessed and/or edited by the user 210.

Figure 3:
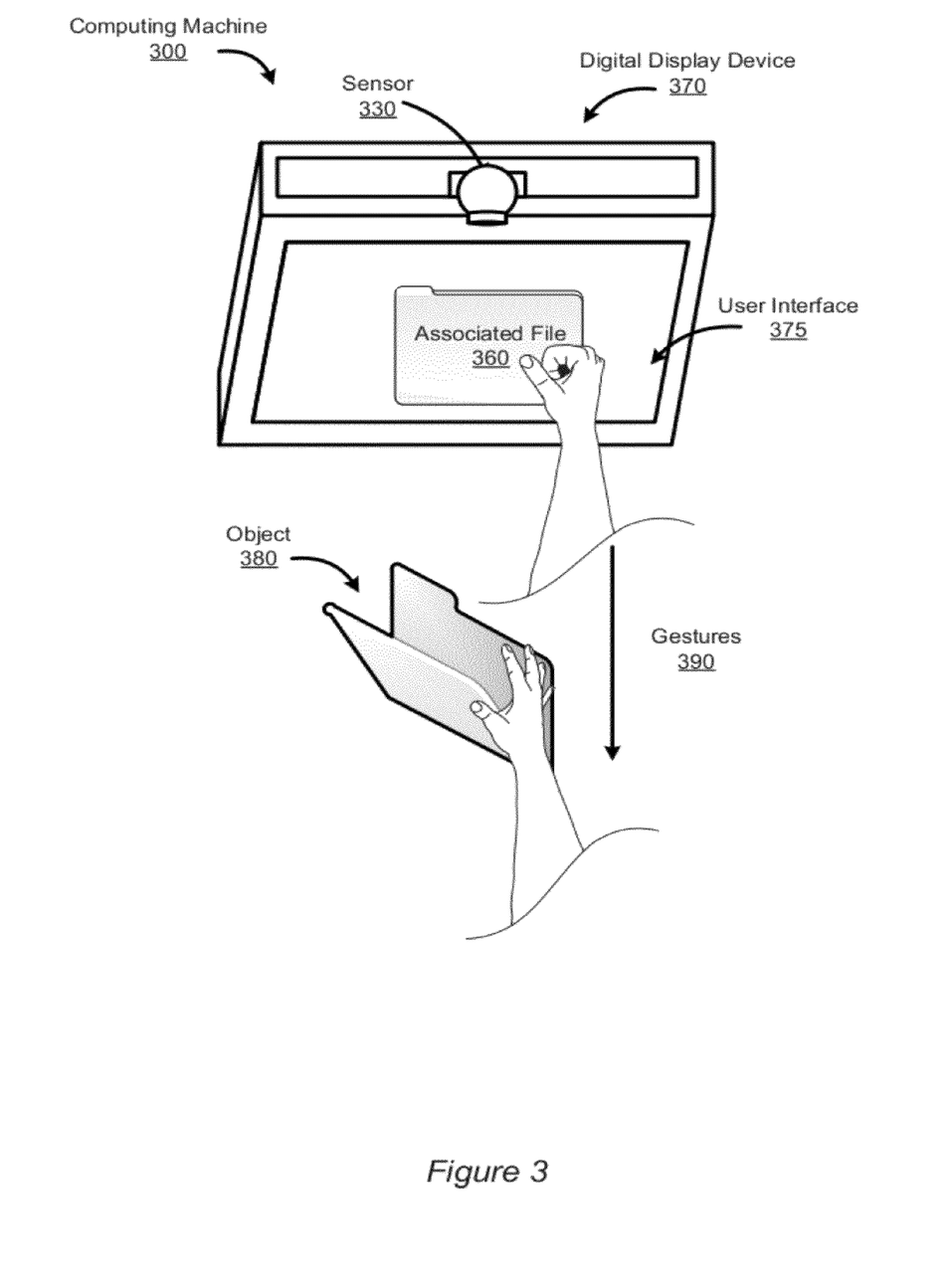
FIG. 3 illustrates a user interacting with an object through at least one gesture according to an embodiment of the invention.

FIG. 3 illustrates a user interacting with an object 380 through at least one gesture 390 according to an embodiment of the invention. As noted above, a file application can associate the object 380 with one or more files 360 in response to the user interacting with the object 380. Additionally, the file application associates the object 380 with one or more of the files 360 when information detected and/or captured from the object 380 does not match predefined information of a recognized object.

As illustrated in FIG. 3, a sensor 330 can be configured to detect and capture a user interacting with the object 380 or one or more of the files 360 through at least one gesture 390. As shown in the present embodiment, at least one of the gestures 390 can include a hand motion or hand gesture.

In one embodiment, as illustrated in FIG. 3, a display device 370 coupled to the computing machine 300 can be configured to render a user interface 370. As shown in the present embodiment, the user interface 370 can display file 360 of the computing machine 300. In another embodiment, the user interface 370 can additionally display the user interacting with file 360 and/or the object 380.

As shown in FIG. 3, the sensor 330 captures the user making a hand gesture 390 originating from a portion of the display device 310, where file 360 is rendered for display. Additionally, the user closes his hand over the portion of the display device 310 where file 360 is rendered. The user then makes a hand gesture 390 moving away from the portion where file 360 is being rendered and moves his hand to the object 380. The user then releases his hand from the closed position to an open position over the object 380.

The sensor 330 sends information of this hand gesture to the file application to identify. The file application identifies the hand gesture 390 between the object 380 and file 350. Additionally, the file application determines that a corresponding command for the hand gesture 390 is an association between the object 380 and file 360. As a result, the file application proceeds to associate file 360 with the object 380.

In one embodiment, the file application additionally stores captured information of the object 380 as predefined information of a recognized object. The predefined information of the recognized object can be used by the file application subsequently to access associated file 360 when object 380 is detected and identified by the sensor 330.

As noted above, once the object 380 is associated with one or more of the files 380, the file application can access and render the associated file 360 on the digital display device 370. Additionally, the file application can continue to configure the sensor 330 to detect one or more gestures 390 from the user when accessing and/or edit the associated files 360.

Figure 4:
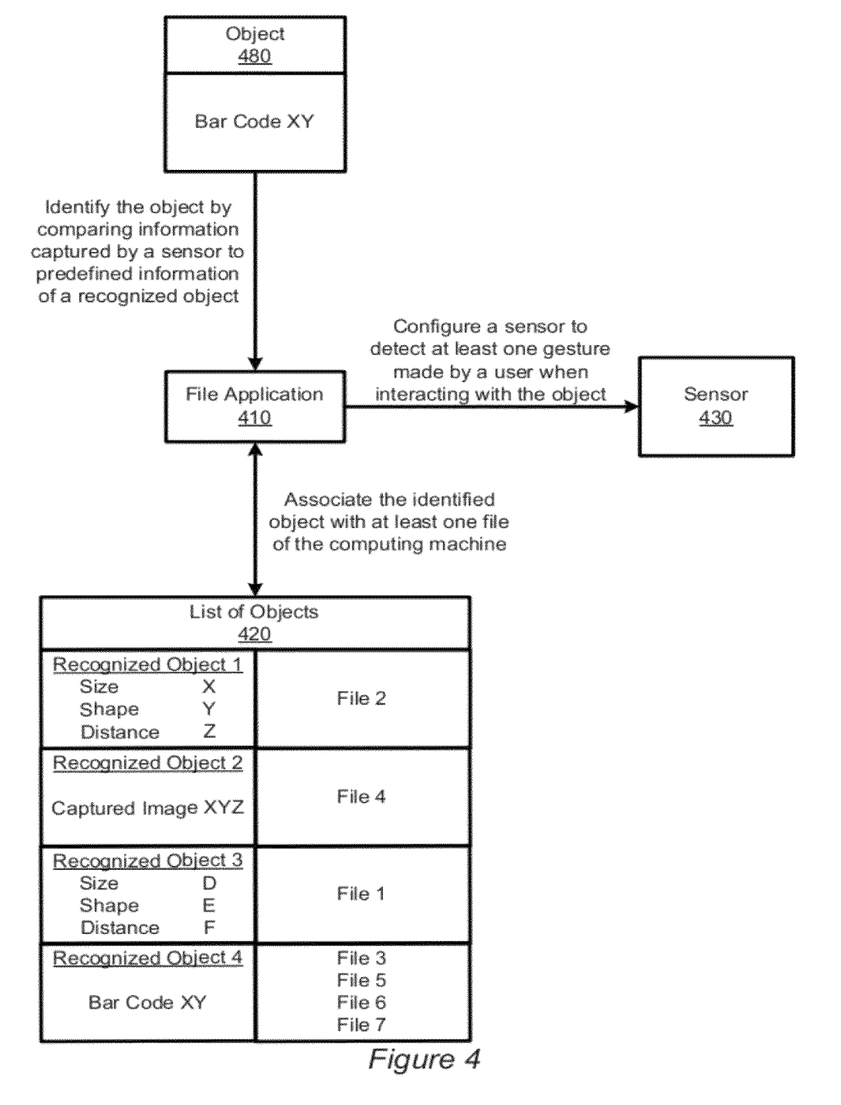
FIG. 4 illustrates a block diagram of a file application identifying an object and associating the object with one or more files of a computing machine according to an embodiment of the invention.

FIG. 4 illustrates a block diagram of a file application 410 identifying an object 480 and associating the object 480 with one or more files of a computing machine according to an embodiment of the invention. As noted above, a sensor 430 of the computing machine can be configured to detect and capture information of an object 480.

In one embodiment, the sensor 430 has detected object 480. As a result, the file application 410 configures the sensor 430 to capture information of the object 480. As shown in FIG. 4, the sensor 430 has scanned the object 480 and identified that the object 480 has a barcode reading XY.

The file application 410 then proceeds to attempt to identify object 480 and associate object 480 with one or more files on the computing machine. As illustrated in FIG. 4, in one embodiment, the file application 410 accesses a list of objects 420. As noted above and as shown in the present embodiment, predefined information of one or more objects recognized by the computing machine or the file application 410 can be stored in the list of objects 420. Further, as shown in FIG. 4, a recognized object can be associated with one or more files of the computing machine.

As illustrated in FIG. 4, the list of objects 420 can include one or more recognized objects (Object 1, Object 2, Object 3, and Object 4). Additionally, the recognized objects in the list include predefined information utilized by the file application 410 when identifying object 480. Further, the recognized objects can list one or more files (File 1, File 2, File 3, File 4, File 5, File 6, and File 7) associated with the corresponding recognized objects.

In one embodiment, the list of objects 420 is stored on a storage device accessible to the file application 410. In another embodiment, the predefined information recognized objects can be stored as part of a file. In other embodiments, the predefined information can be included in a database of objects accessible to the computing machine and/or the file application 410.

As shown in FIG. 4, the file application 410 accesses the list of objects 420 and scans for a recognized object which has a bar code of XY. As shown in the present embodiment, the file application 410 identifies that recognized object 4 has a bar code of XY. Additionally, recognized object 4 is listed to be associated with File 3, File 5, File 6, and File 7. As a result, the file application 410 identifies the object 480 as recognized object 4 and associates File 3, File 5, File 6, and File 7 with the object 480.

As noted above, once the object 480 has been associated with one or more files of the computing machine, the associated files can be accessed and/or edited by the user in response to the sensor 430 detecting the user interacting with the object 480 through one or more gestures.

Figure 5:
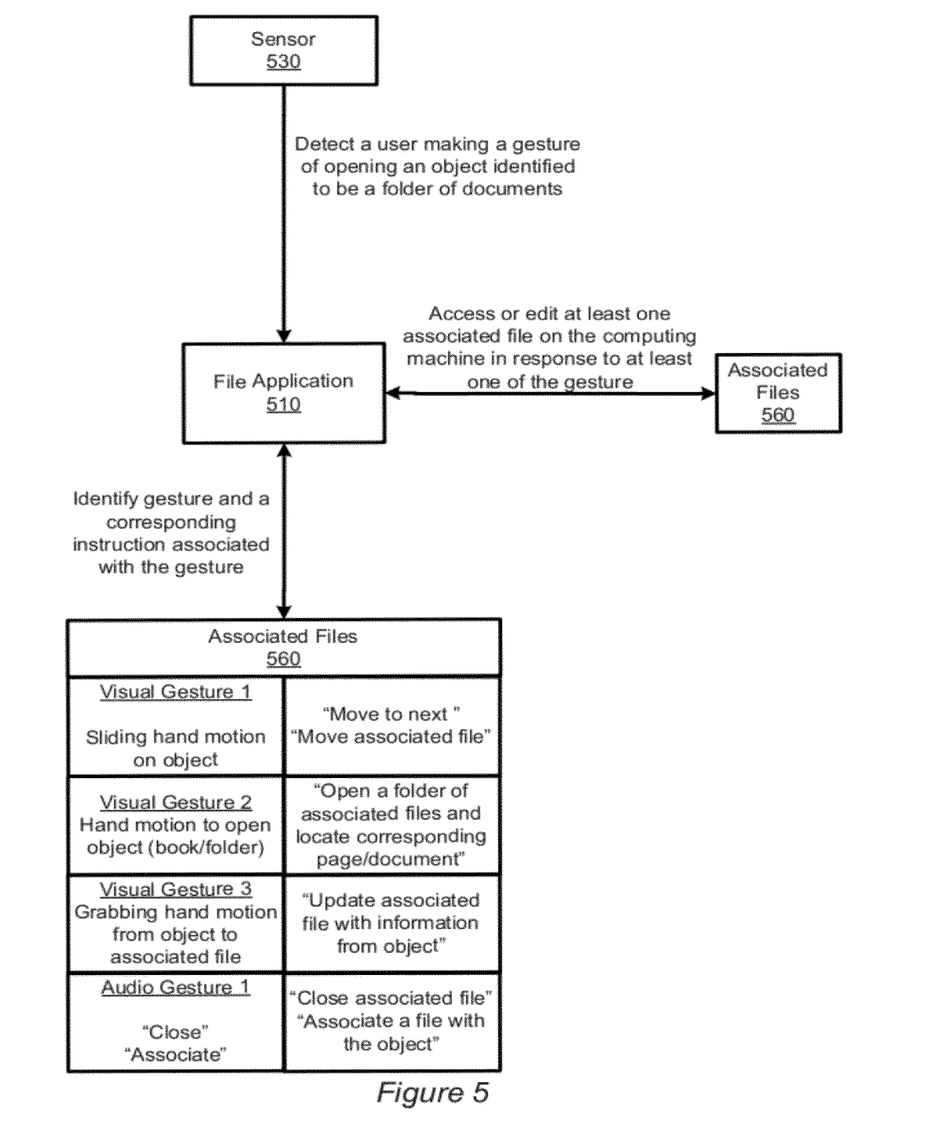
FIG. 5 illustrates a block diagram of a file application accessing or editing one or more associated files on a computing machine in response to a gesture from a user according to an embodiment of the invention.

FIG. 5 illustrates a block diagram of a file application 510 accessing or editing one or more associated files 560 on a computing machine in response to a gesture from a user according to an embodiment of the invention. In one embodiment, the sensor 530 has detected the object and the file application 510 has associated files 560 on the computing machine with the object utilizing one or more of the methods disclosed above.

Additionally, as illustrated in FIG. 5, the sensor 530 has detected and captured at least one gesture made by a user. As noted above and as illustrated in FIG. 5, one or more gestures from the user can be utilized to access and/or edit associated files 560. When accessing and/or editing the associated files, the file application 510 attempts to identify a corresponding command or action associated with the captured gesture.

As shown in FIG. 5, in one embodiment the associated files 560 can list one or more commands which can be executed on the associated files 560. Additionally, the commands can have corresponding gestures which a user can utilize to trigger the commands. In other embodiments, one or more of the commands and the corresponding gestures can be stored in additional locations accessible to the file application 510 in addition to and/or in lieu of those noted above.

As illustrated in FIG. 5, Visual Gesture 1, Visual Gesture 2, Visual Gesture 3, and Audio Gesture 1 are gestures which the sensor 530 can detect and the user can utilize when accessing and/or editing the associated files 560. In one embodiment, the sensor 530 and/or the file application 510 have identified the object to be a folder of documents. Additionally, the sensor 530 detects the user interacting with the object through a gesture. As noted in FIG. 5, the gesture includes the user opening the object (the folder of documents).

In response, the file application 510 attempts to identify the gesture and a command associated with gesture. As shown in FIG. 5, the file application 510 finds that Visual Gesture 2 lists the gesture to include the user making a hand motion to open the object (book/folder). Additionally, the command corresponding to Visual Gesture 2 is to open a folder of the associated files 560 and locate the corresponding page or document which is currently being displayed in the folder object.

In other embodiments, the user can interact with the object to access or edit the associated media 560 using additional gestures in addition to and/or in lieu of those noted above and illustrated in FIG. 5. Utilizing one or more gestures, the user can continue to interact with the object and access and/or edit one or more of the associated files in response to one or more of the gestures.

Figure 6:
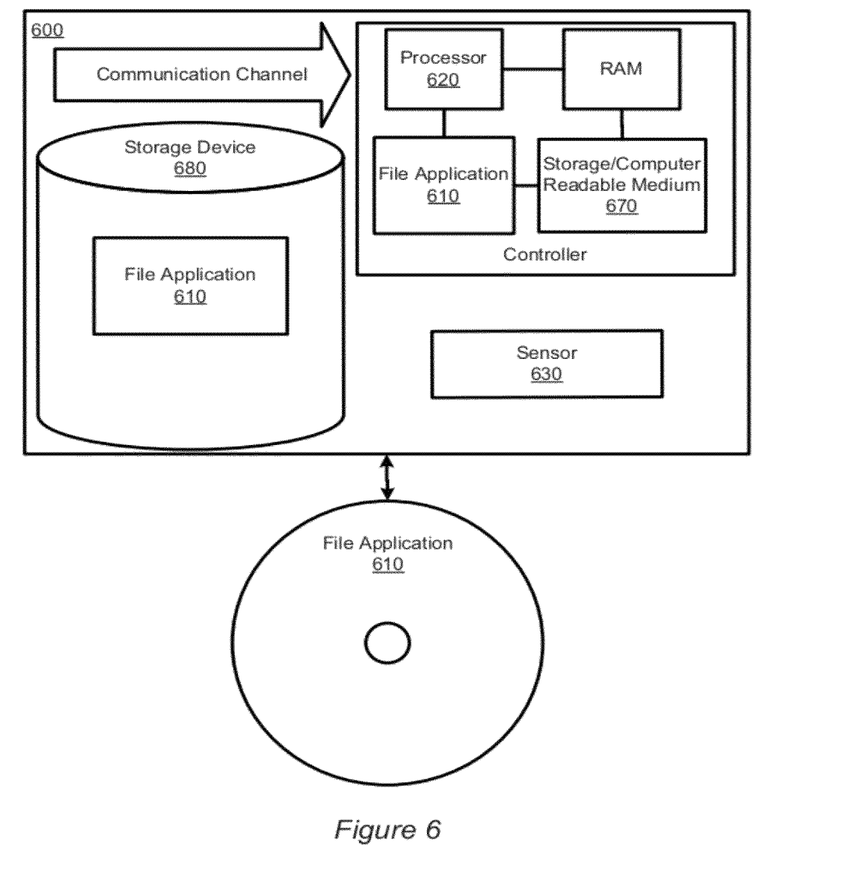
FIG. 6 illustrates a computing machine with an embedded file application and a file application stored on a storage medium being accessed by the computing machine according to an embodiment of the invention.

FIG. 6 illustrates a computing machine 600 with an embedded file application 610 and a file application 610 stored on a storage medium 640 being accessed by the computing machine 600 according to an embodiment of the invention. For the purposes of this description, a storage medium 640 is any tangible apparatus that contains, stores, communicates, or transports the file application 610 for use by or in connection with the computing machine 600. As noted above, in one embodiment, the file application 610 is firmware that is embedded into one or more components of the computing machine 600 as ROM. In other embodiments, the file application 610 is a software application which is stored and accessed from a storage medium 640 or any other form of computer readable medium that is coupled to the computing machine 600.

Figure 7:
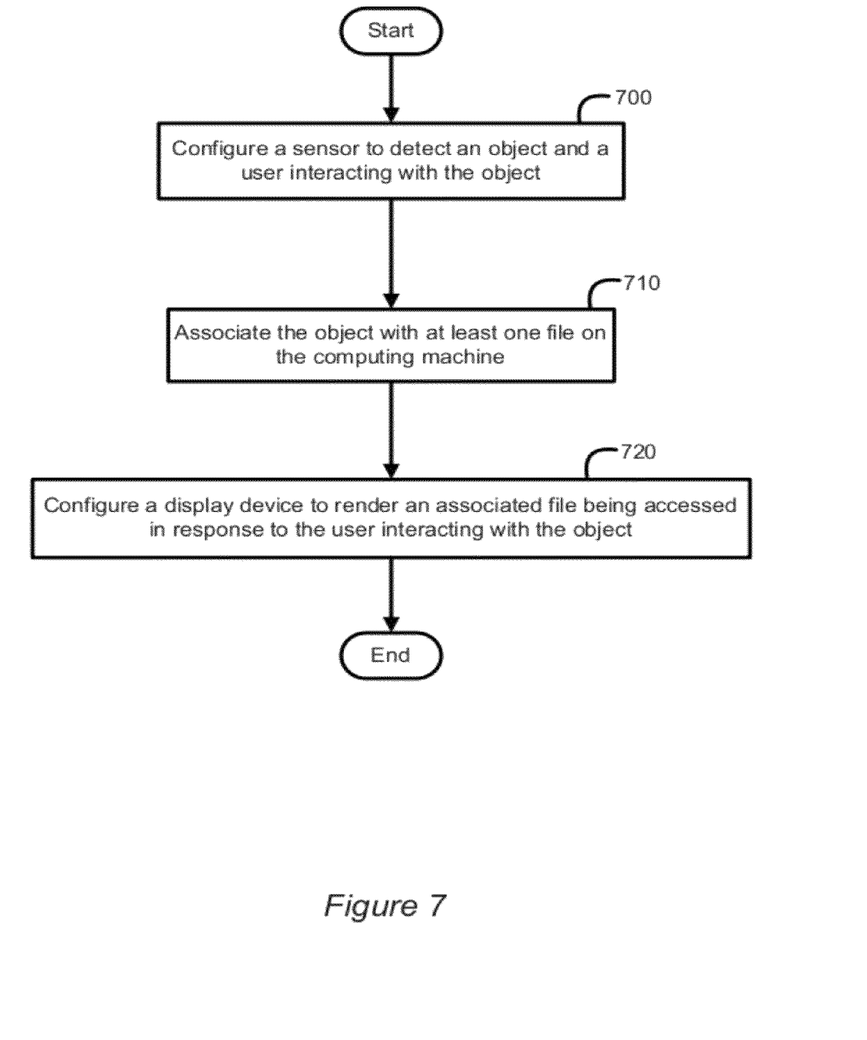
FIG. 7 is a flow chart illustrating a method for accessing a file on a computing machine according to an embodiment of the invention.

FIG. 7 is a flow chart illustrating a method for accessing a file on a computing machine according to an embodiment of the invention. The method of FIG. 7 uses a computing machine coupled to a sensor, a processor, a file application, a display device and/or a storage device. In other embodiments, the method of FIG. 7 uses additional components and/or devices in addition to and/or in lieu of those noted above and illustrated in FIGS. 1, 2, 3, 4, 5, and 6.

As noted above, the processor and/or the file application can configure the sensor to scan an environment of the computing machine for an object and detect a user interacting with the object 700. The object can include any physical object, media, and/or document which a user can interact with. In one embodiment, the object can include a document, a folder or collection of documents, a book, a newspaper, and/or a notepad.

Once an object is detected, the file application will then proceed to associate the object with one or more files on the computing machine 710. As noted above, a file on the computing machine can include a system file, an application file, a document file, and/or a media file.

In one embodiment, before associating the object with one or more files, the file application will configure the sensor to detect and/or capture information of the object and attempt to identifying the object. The information can include dimensions of the object. In another embodiment, the information can include a bar code or a visual signature included on the object. In other embodiments, the information can include a visual image of the object.

Utilizing the information detected and/or captured from the object, the file application proceeds to compare the information to predefined information of one or more recognized objects. The recognized objects are objects which are recognized by the computing machine and associated with one or more files on the computing machine. Further, the predefined information can include dimensions of the recognized object, a bar code or visual signature of the recognized object, and/or an image of the recognized object.

If the file application finds that the detected and/or captured information matches predefined information of one of the recognized objects, the file application will proceed to identify the object as the recognized object and associate the object with the files listed to be associated with the recognized object.

In another embodiment, if the file application does not find a match, the user can proceed to associate the object with one or more of the files on the computing machine. As noted above, one or more of the files can be rendered as part of a user interface on a display device. When associating the object with one or more of the files, the user can utilize one or more gestures. A gesture can include a visual gesture, an audio gesture, and/or a touch gesture. The gesture can be made to or from the object and/or the computing machine.

In one embodiment, the user makes a visual gesture by moving his hand from the object to a media displayed on the digital display device. The sensor can detect and capture this gesture for the file application. The file application then proceeds to determine that the user is associating the object with the corresponding file. As a result, the file application associates the corresponding file with the object. Additionally, the file application can create a new a recognized object with captured information of the object and list the recognized object to be associated with the corresponding files.

Once the object has been associated with one or more of the files on the computing machine, the file application can access and/or retrieve one or more of the associated files. Additionally, the file application can configure the display device to render one or more associated files being accessing in response to the user interacting with the object 720.

As noted above, when accessing and/or editing one or more of the associate files, the file application can configure the sensor to detect and/or capture one or more gestures from the user and attempt to identify a corresponding command associated with the gesture. As noted above, one or more recognized gestures and the corresponding commands can be listed as part of an associated file. In another embodiment, one or more gestures and their corresponding commands can be included in a list or a database.

If the file application is able to find a matching gesture and an associated command corresponding to the gesture, the file application will execute the corresponding command on when accessing or editing an associated file. The method is then complete or the file application can continue to access and/or edit the associated files in response to the user interacting with the object. In other embodiments, the method of FIG. 7 includes additional steps in addition to and/or in lieu of those depicted in FIG. 7.

Figure 8:
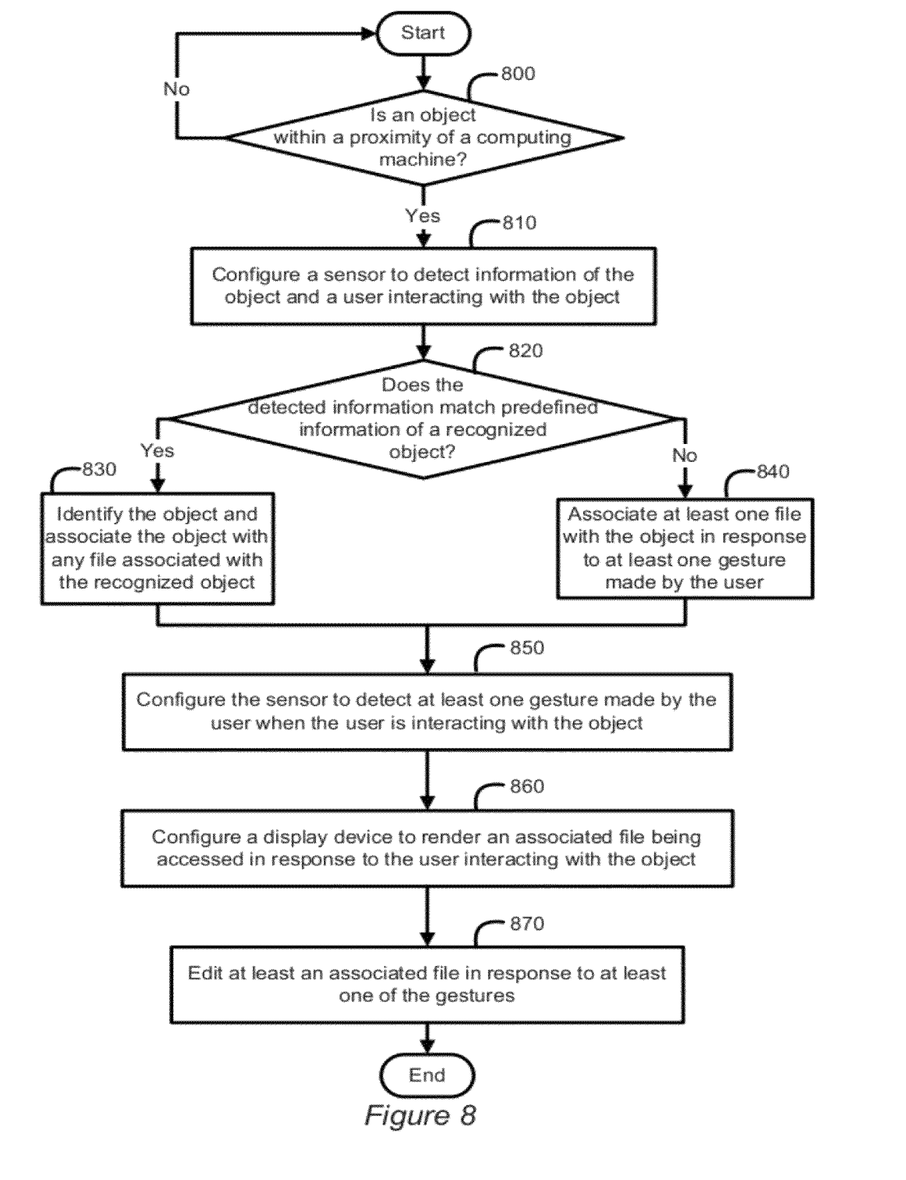
FIG. 8 is a flow chart illustrating a method for accessing a file on a computing machine according to another embodiment of the invention.

FIG. 8 is a flow chart illustrating a method for editing media on a computing machine according to another embodiment of the invention. Similar to the method disclosed in FIG. 7, the method of FIG. 8 uses a computing machine coupled to a sensor, a processor, a file application, a display device and/or a storage device. In other embodiments, the method of FIG. 8 uses additional components and/or devices in addition to and/or in lieu of those noted above and illustrated in FIGS. 1, 2, 3, 4, 5, and 6.

As noted above, the file application and/or the processor can initially configure the sensor to scan an environment around the computing machine for an object and identify a distance of the object. In one embodiment, the sensor is a 3D depth image capture device configured to scan a viewing area and/or a volume around the computing machine for the object. Additionally, the object can include any physical object, physical document, and/or physical media.

If an object is found, the file application will then proceed to determine whether the object is within a proximity of the computing machine 800. When determining whether the object is within a proximity of the computing machine, the file application will compare a detected and/or captured distance of the object to a predefine distance. If the distance is less than the predefined distance, the file application will determine that the object is within the predefined distance and proceed to configure the sensor to detect and/or capture information of the object and a user interacting with the object.

In another embodiment, if the object is not within proximity of the computing machine, the file application can configure the display device to render a message for the user to bring the object closer. Once the object is within proximity, the sensor can detect and/or capture information of the object and the user interacting with the object.

As noted above, the information detected and/or captured by the sensor can include one or more dimensions of the object, a bar code or visual signature of the object, and/or an image of the object. In other embodiments, the information can include additional information in addition to and/or in lieu of those noted above.

Utilizing the captured information, the file application will determine whether the captured information matches any predefined information from a recognized object 820. As noted above, a recognized object is an object which the computing machine and/or the file application recognizes. Additionally, the recognized object is associated with one or more files of the computing machine. Further the predefined information can include one or more dimensions of the recognized object, a bar code or a visual signature of the recognized object, and/or an image of the recognized object.

The file application will utilize the information detected and/or captured by the sensor and scan the predefined information of the recognized objects for a match. If a match is found, the file application will proceed to identify the object as the recognized object and proceed to associate one or more of the files associated with the recognized object with the object 830.

In one embodiment, if no match is found, the file application will determine that the object is not recognized and no files are immediately associated with the object. In another embodiment, the file application will proceed to associate at least one file with the object in response to at least one gesture made by the user 840. As noted above, a gesture can include a visual gesture consisting of motion made by the user, an audio gesture made when the user speaks, and/or a touch gesture when the user touches the object and/or one or more components of the computing machine.

In one embodiment, once the object is associated with one or more files of the computing machine the file application can configure the sensor to detect at least one gesture made by the user when the user is interacting with the object 850. Additionally, the file application can configure the display device to render a user interface of at least one of the associated files being accessed in response to the user interacting with the object 860. The user interface can display the associated files being accessed and/or edited. In another embodiment, the user interface can display the object and/or the user interacting with the object.

If the sensor detects any additional gestures from the user, the sensor will capture the gesture for the file application to attempt to identify. As noted above, one or more of the associated files can list or store recognized gestures and corresponding commands for the recognized gestures. The file application will determine whether the captured gesture matches one or more of the recognized gestures. If a match is found, the file application will proceed to edit and/or access at least one of the files in response to the gesture 870.

In one embodiment, the file application additionally configures the display device to render any associated files being edited and/or accessed. The method is then complete or the file application can continue to access and/or edit any associated files of the object in response to the user interacting with the object. In other embodiments, the method of FIG. 8 includes additional steps in addition to and/or in lieu of those depicted in FIG. 8.

By configuring a sensor to detect an object, the object can accurately and securely be associated with one or more files of a computing machine. Additionally, by accessing and/or editing one or more of the associated files of in response to the user making one or more gestures from the user with the object, a natural and a user friendly experience can be created for the user when the user is interacting with the object.

What is claimed is:

1. A method for operating a computing device, the method comprising:
   detecting a physical object within a viewing area of a three-dimensional depth sensor of the computing device;
   determining whether the physical object is within a predefined proximity of the computing device;
   on a display of the computing device, prompting a user to re-position the physical object when the physical object is determined to be outside the predefined proximity;
   determining that the physical object, when re-positioned within the predefined proximity, is not associated with a file stored in a memory of the computing device;

in response to determining that the physical object is not associated with a file stored in the memory, enabling the user to associate the physical object with at least one file stored in the memory by performing a hand gesture with respect to the physical object and a representation of the at least one file presented on the display of the computing device;

detecting the hand gesture using the sensor by detecting the user (i) closing a hand over a portion of the display on which the representation of the at least one file is presented, (ii) moving the closed hand away from the display and to the physical object, and (iii) opening the hand over the physical object; and in response to detecting the user opening the hand over the physical object, associating the physical object with the at least one file.

2. The method of claim 1, wherein detecting the physical object includes causing the sensor to detect the physical object in response to receiving a request to scan the viewing area of the sensor.

3. The method of claim 1, wherein detecting the physical object includes determining information corresponding to the detected physical object, and wherein determining that the physical object is not associated with a file stored in a memory includes (i) comparing the information corresponding to the detected physical object with predefined information of a plurality of objects stored in the memory, and (ii) determining that the information corresponding to the detected physical object does not match predefined information for any of the plurality of objects.

4. The method of claim 3, wherein associating the physical object with the at least one file includes storing the information corresponding to the detected physical object with the predefined information of the plurality of objects in the memory.

5. The method of claim 1, wherein detecting the hand gesture performed by the user includes determining that the hand gesture corresponds to a command to associate the physical object with the at least one file.

6. The method of claim 1, wherein detecting the physical object includes determining one or more dimensions of the physical object using the sensor.

7. The method of claim 1, wherein detecting the physical object includes detecting a bar code provided on the physical object using the sensor.

8. A computing device, comprising:
a three-dimensional depth sensor;
a display;
a memory storing instructions and a plurality of files; and
a processor, coupled to the at least one sensor, the display, and the memory, the processor to execute the instructions, wherein the instructions, when executed, cause the computing device to perform operations comprising:
  detecting a physical object within a viewing area of the sensor;
  determining whether the physical object is within a predefined proximity of the computing device;
  on a display of the computing device, prompting a user to re-position the physical object when the physical object is determined to be outside the predefined proximity;
  determining that the physical object, when re-positioned within the predefined proximity, is not associated with any of the plurality of files;
  in response to determining that the physical object is not associated with any of the plurality of files, enabling the user to associate the physical object with at least one file of the plurality of files by performing a hand gesture with respect to the physical object and a representation of the at least one file presented on the display;
  detecting the hand gesture using the sensor by detecting the user (i) closing a hand over a portion of the display on which the representation of the at least one file is presented, (ii) moving the closed hand away from the display and to the physical object, and (iii) opening the closed hand over the object; and
  in response to detecting the user opening the hand over the physical object, associating the physical object with the at least one file.

9. The computing device of claim 8, wherein the instructions cause the computing device to detect the physical object by determining information corresponding to the detected physical object, and cause the computing device to determine that the physical object is not associated with any of the plurality of files by (i) comparing the information corresponding to the detected physical object with predefined information of a plurality of objects stored in the memory, and (ii) determining that the information corresponding to the detected physical object does not match predefined information for any of the plurality of objects.

10. The computing device of claim 8, wherein the instructions cause the computing device to detect the hand gesture performed by the user by (i) tracking a movement and direction of the hand gesture, and (ii) determining that the hand gesture corresponds to a command to associate the physical object with the at least one file.

11. The computing device of claim 8, wherein the instructions cause the computing device to detect the physical object by determining one or more dimensions of the physical object using the sensor or detecting a bar code provided on the physical object using the sensor.

12. A non-transitory computer-readable medium storing instructions that, when executed by a processor of a computing device, cause the computing device to perform operations comprising:
detecting a physical object within a viewing area of a three-dimensional depth sensor of the computing device;
determining whether the physical object is within a predefined proximity of the computing device;
on a display of the computing device, prompting a user to re-position the physical object when the physical object is determined to be outside the predefined proximity;
determining that the physical object, when re-positioned within the predefined proximity, is not associated with a file among a plurality of files stored in the non-transitory computer-readable medium or another memory of the computing device;
in response to determining that the physical object is not associated with a file, enabling the user to associate the physical object with at least one file of the plurality of files stored in the non-transitory computer-readable medium or the other memory of the computing device by performing a hand gesture with respect to the physical object and a representation of the at least one file presented on a display of the computing device;
detecting the hand gesture using the sensor by detecting the user (i) closing a hand over a portion of the display on which the representation of the at least one file is presented, (ii) moving the closed hand away from the display and to the physical object, and (iii) opening the closed hand over the physical object; and in response to detecting the user opening the hand over the physical object, associating the physical object with the at least one file.

13. The non-transitory computer-readable medium of claim 12, wherein the instructions cause the computing device to detect the physical object by causing the sensor to detect the physical object in response to receiving a request to scan the viewing area of the sensor.

14. The non-transitory computer-readable medium of claim 12, wherein the instructions cause the computing device to detect the physical object by determining information corresponding to the detected physical object, and cause the computing device to determine that the physical object is not associated with any of the plurality of files by (i) comparing the information corresponding to the detected physical object with predefined information of a plurality of objects stored in the memory, and (ii) determining that the information corresponding to the detected physical object does not match predefined information for any of the plurality of objects.

15. The non-transitory computer-readable medium of claim 14, wherein the instructions cause the computing device to associate the physical object with the at least one file by storing the information corresponding to the detected physical object with the predefined information of the plurality of objects in the memory.

16. The non-transitory computer-readable medium of claim 12, wherein the instructions cause the computing device to detect the hand gesture performed by the user by (i) tracking a movement and direction of the hand gesture, and (ii) determining that the hand gesture corresponds to a command to associate the physical object with the at least one file.

17. The non-transitory computer-readable medium of claim 12, wherein the instructions cause the computing device to detect the physical object by determining one or more dimensions of the physical object using the sensor.

18. The non-transitory computer-readable medium of claim 12, wherein the instructions cause the computing device to detect the physical object by detecting a bar code provided on the physical object using the sensor.

19. The non-transitory computer-readable medium of claim 12, wherein the instructions cause the computing device to detect the physical object by detecting an image provided on the physical object using the sensor.

* * * * *